US007044375B2

(12) United States Patent
Scott

(10) Patent No.: US 7,044,375 B2
(45) Date of Patent: May 16, 2006

(54) WEB BASED VOTING TRACKING AND REPORTING SYSTEM

(76) Inventor: Anthony Scott, 641 BrookBank Rd., Downers Grove, IL (US) 60516

( * ) Notice: Subject to any disclaimer, the term of this patent is extended or adjusted under 35 U.S.C. 154(b) by 92 days.

(21) Appl. No.: 10/624,782

(22) Filed: Jul. 22, 2003

(65) Prior Publication Data

US 2004/0117244 A1 Jun. 17, 2004

Related U.S. Application Data

(60) Provisional application No. 60/397,570, filed on Jul. 22, 2002.

(51) Int. Cl.
*G06F 17/60* (2006.01)

(52) U.S. Cl. .................................... 235/386; 235/385

(58) Field of Classification Search ................ 235/386, 235/375, 385; 705/12; 380/347, 355, 28, 380/30
See application file for complete search history.

(56) References Cited

U.S. PATENT DOCUMENTS

| | | | | |
|---|---|---|---|---|
| 4,641,240 | A | 2/1987 | Boram | 364/409 |
| 5,117,358 | A | 5/1992 | Winkler | 364/419 |
| 5,189,288 | A | 2/1993 | Anno et al. | 235/386 |
| 5,377,099 | A | 12/1994 | Miyagawa | 364/409 |
| 5,400,248 | A | 3/1995 | Chisholm | 364/409 |
| 5,583,329 | A | 12/1996 | Davis, III et al. | 235/50 |
| 5,610,383 | A | 3/1997 | Chumbley | 235/386 |
| 5,732,222 | A | 3/1998 | Miyagawa et al. | 395/212 |
| 5,875,432 | A | 2/1999 | Sehr | 705/12 |
| 5,878,399 | A | 3/1999 | Peralto | 705/12 |
| 6,824,053 | B1 * | 11/2004 | Bluemer | 235/386 |
| 2002/0019767 | A1 * | 2/2002 | Babbitt et al. | 705/12 |
| 2002/0077886 | A1 | 6/2002 | Chung | 705/12 |
| 2002/0091564 | A1 | 7/2002 | Geller | 705/12 |
| 2002/0128978 | A1 * | 9/2002 | Neff | 705/64 |
| 2003/0154124 | A1 * | 8/2003 | Neff | 705/12 |
| 2004/0030894 | A1 * | 2/2004 | Labrou et al. | 713/168 |

FOREIGN PATENT DOCUMENTS

| | | |
|---|---|---|
| EP | 0556853 A2 | 8/1993 |

* cited by examiner

*Primary Examiner*—Daniel Stcyr
(74) *Attorney, Agent, or Firm*—McAndrews, Held & Malloy Ltd.

(57) ABSTRACT

This invention is directed to the need for real-time functionality in the voting process. A vote tracking and reporting system is provided that will read ballots and transmit encrypted vote data to a secured collection and processing system. The secured collection and processing system totals votes and monitors ballot irregularities. Authorized users access the secured processing system and server to retrieve vote totals. Election authorities can access the secured processing system and server to monitor ballot irregularities to assure that ballots are being properly used and counted.

5 Claims, 3 Drawing Sheets

WEB BASED VOTING TRACKING AND REPORTING SYSTEM

CROSS-REFERENCE TO RELATED APPLICATIONS

Priority is claimed from provisional application U.S. Ser. No. 60/397,570, filed Jul. 22, 2002, now pending. The entire specification and all the claims of the provisional application referred to above are hereby incorporated by reference to provide continuity of disclosure.

STATEMENT REGARDING FEDERALLY SPONSORED RESEARCH OR DEVELOPMENT

NONE

BACKGROUND OF THE INVENTION

As demonstrated by recent elections, problems arising from difficulties in counting votes and inaccuracies in reading ballots can disrupt elections and even delay determination of the election results. During an election, in many polling places a voter submits his or her vote to be read by an optical scanner. Ballots are stored until polls close when votes are counted and the results of the counts are certified and announced to the public. The ballot counting process usually consists of counting votes in voting regions such as counties and then submitting the results of those regional counts to a central counting authority that totals submitted counts to determine the outcome of the election.

Vote counting and calculation of statistical results are frequently performed by processes that are at least in part manual processes and require thousands of man-hours. In elections where results are determined for counties, it may take two or more hours for a county to count votes. A common source of delay and inaccuracy in vote counting as well as spoliation of ballots is that the election authorities often depend upon the election judges to identify and report voting irregularities, ballot difficulties and voting equipment problems. Frequently, voting problems are not identified during voting, but are identified during vote counting and result certification after any remedial action or additional assistance can limit the number of ballots that are affected by the problem.

Frequently, the time required to count votes delays notification of candidates and the public of the election results, often until into the early morning of the next day. Another consequence of delayed determining and announcing official results is that estimates and predictions are often reported. Those reports can be inaccurate and stale, and can even influence voters.

A need exists for a system that monitors voting and identifies irregularities and problems with ballots and counting equipment while an election is taking place. In addition, a need exists for a system that can report vote tallies quickly and accurately as an election is conducted.

BRIEF SUMMARY OF THE INVENTION

To address the problems identified by the preceding section and others, the present invention provides a system for tracking, reporting and evaluating votes while the election is taking place. The system has an acquisition and communication device, such as a computer or personal digital assistant, that gathers data at a polling place from ballot counting machines, encrypts the data, and transmits the data by wired or wireless telephone lines or wired or wireless data network to a collection and processing system. The polling place acquisition and communication device and the collection and processing system are preferably connected to the Internet though other communication connections may be used. The collection and processing system decrypts and analyzes data received from polling place acquisition and communication devices to tally votes and to identify potential problems with ballots or reading of the ballots by the counting machine. The polling place acquisition and communication device transmits data to the collection and processing system in response to a request received by the polling place device. The polling place acquisition and communication device also transmits data to the collection and processing system in response to events such as acquisition of vote data, time of day, elapsed time, or others.

A voting tracking and reporting system according to the present invention quickly identifies potential problems with ballots such as ballot rejections and problems with counting machines while polls are open. In addition to identifying problems with ballots or counting machines, a voting tracking and reporting system according to the present invention monitors the election results by office or question presented by the ballot and by location (precincts or district) in real-time. The system according to the present invention does not supplant procedures for officially counting and certifying election results, but rather provides a real time monitoring of voting and more accurate initial counts than can be developed from polling and sampling of voters.

DETAILED DESCRIPTION OF THE PREFERRED EMBODIMENT

Figure 1:
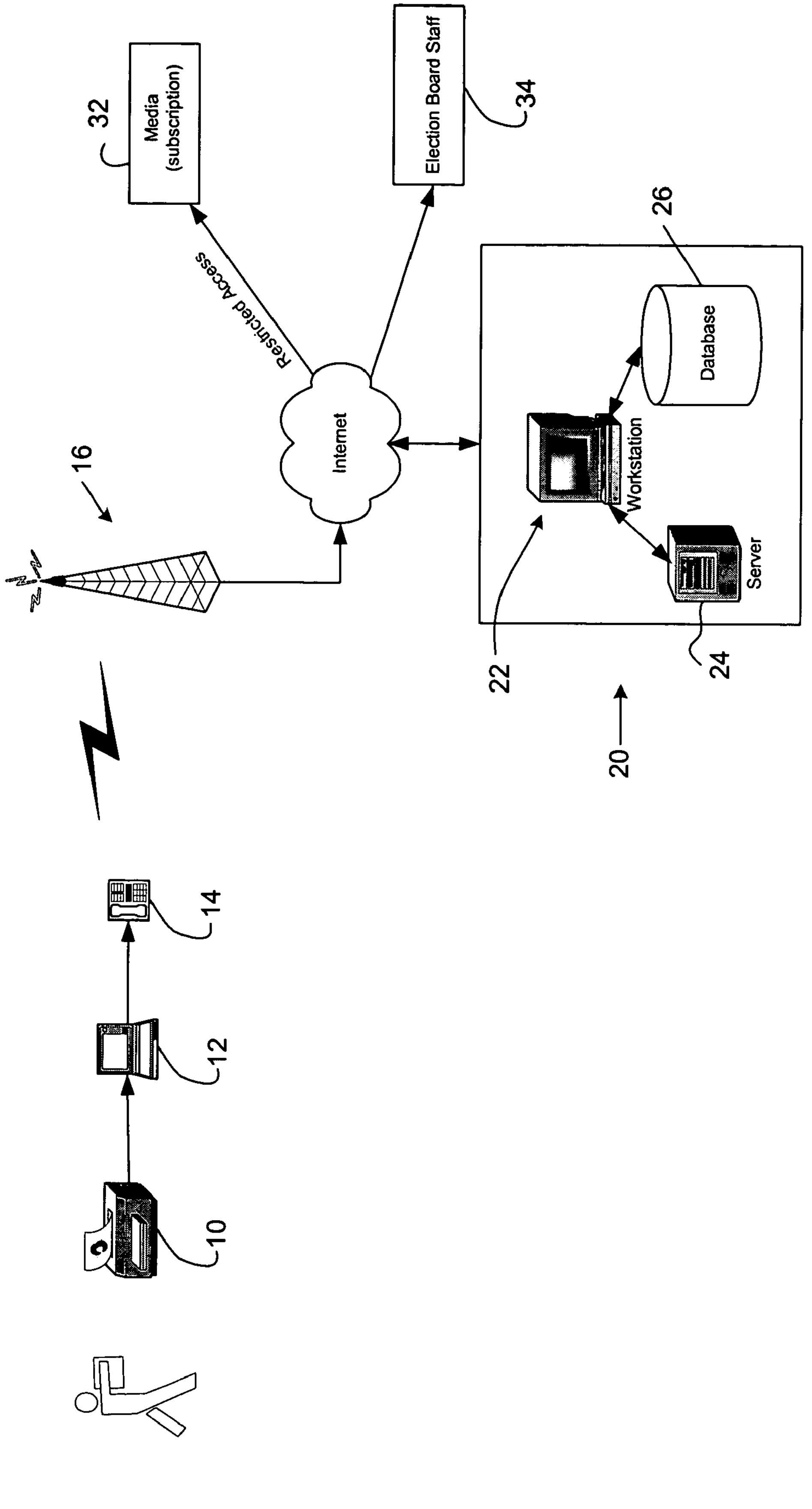
FIG. 1 is a schematic illustration of an embodiment of a vote tracking and reporting system according to the present invention.

FIG. 1 shows a voting tracking and reporting system according to the present invention. An optical ballot reader 10 at a polling place reads ballots and transmits data representing votes of ballots via a data port of the ballot reader 10. A laptop computer 12 receives the vote data from the ballot reader 10. The laptop computer 12 has specialized software to encrypt the vote data. Encrypted vote data from the laptop computer 12 is transmitted by a wireless telephone 14 from the polling place via conventional communication system for data such as a cellular telephone system indicated as 16 by FIG. 1.

The laptop computer 12 transmits data via the wireless telephone 14 either in response to a request for data transmission, or in response to a defined event. Defined events can be acquisition of vote data from the ballot reader 10, acquisition of a specified amount of vote data, time of day, passage of a length of time since a data transmission. Data may also be transmitted as a result of a combination of events. The laptop computer 12 may also transmit vote data in response to requests for transmission of data received via the wireless telephone 14 and the communication system to which the wireless telephone 14 is connected. Of course, the laptop computer 12 may also transmit vote data in response to input to the laptop computer via other computer input channels, such as a key board of other conventional communication.

The cellular telephone system 16 in FIG. 1 is connected to the Internet. Encrypted vote data moves from the cellular telephone system 16 to the Internet and to a secured collection and processing system 20 of the vote tracking and reporting system.

The secured collection and processing system 20 consists of a gateway server 24 that receives encrypted vote data from the Internet from one or more polling places. A workstation 22 receives the encrypted vote data from the gateway server 24. The workstation 22 decrypts the data, and stores the data in a database 26. As presently preferred, the database 26 will be created and accessed by software provided by the Oracle Corporation and the server will have a Linux operating system distributed by Red Hat, Inc. The workstation 22 totals votes and stores vote data in the database. The workstation determines characteristics of the vote data including statistics that are conventionally considered in evaluating election results such as voting results per polling place or region. The workstation 22 also determines characteristics that evaluate vote data to indicate whether irregularities are being experienced at polling places. The workstation 22 counts the number of ballot rejections and failures of the optical scanner to read ballots to identify potential problems with voting equipment or ballots.

The secured collection and processing system 20 will transmit election results, voting data, and voting evaluations via secured communication over the Internet to authorized users of the voting reporting system. The secured collection and processing system 20 will provide voting information in real time. A primary user of the system will be election authorities who will monitor voting results and ballot evaluations using the voting tracking and reporting system to determine whether any irregularities exist. Voting results may also be provided to news media subscribers that will report and analyze voting results. Authorized users will be required to log onto a secure web site to receive the incoming stream of information from the secured server 24.

Figure 2:
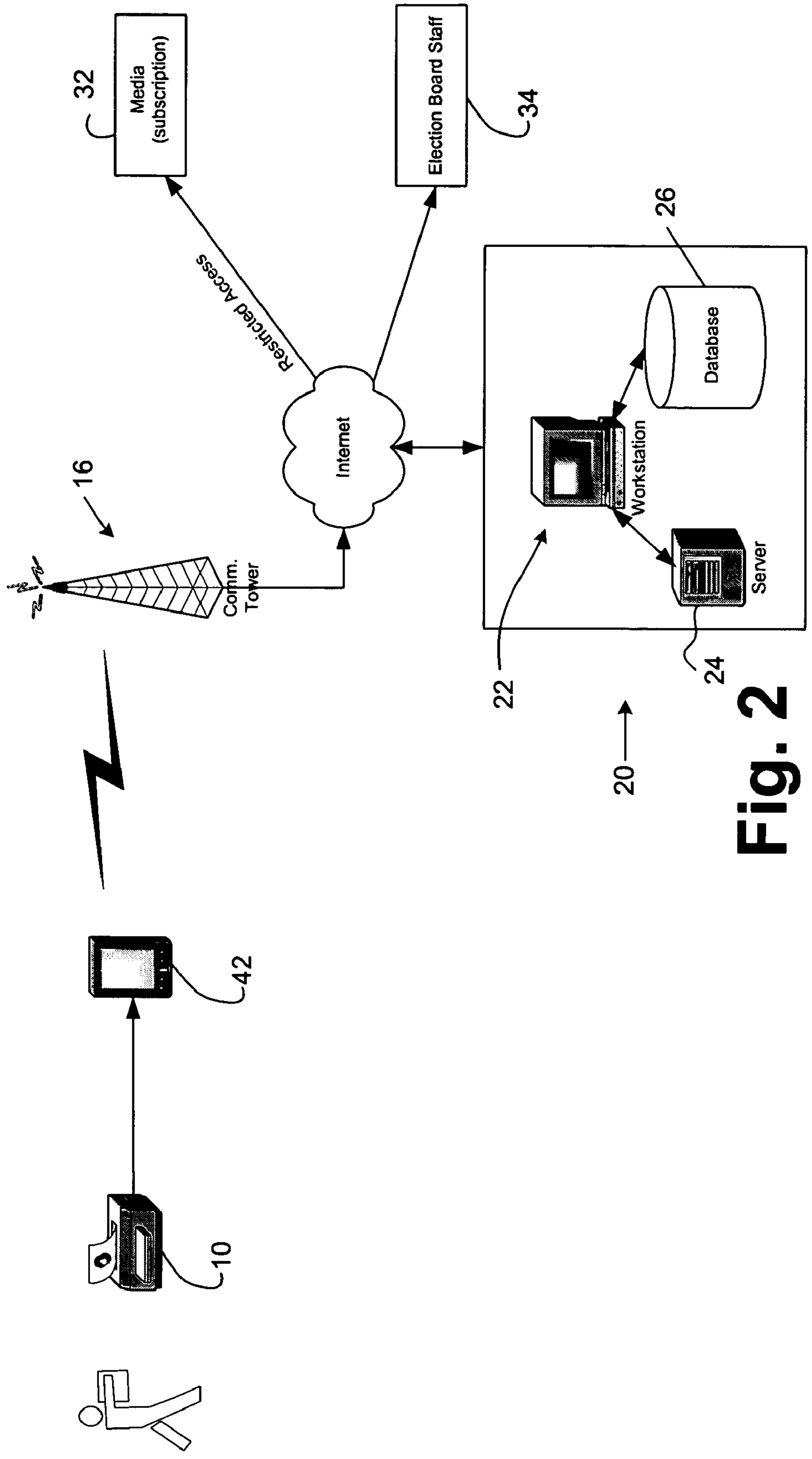
FIG. 2 is a schematic illustration of a second embodiment of a vote tracking and reporting system according to the present invention.

FIG. 2 illustrates a voting tracking and reporting system according to the present invention similar to that illustrated by FIG. 1 and described above. As shown by FIG. 2, the function of the laptop computer 12 and wireless telephone 14 at a polling place may be combined in a single device, such as personal digital assistant 42 having a cellular telephone. Alternatively, a laptop configured for wireless network communication rather than telephone communication will also provide the data transmitting functionality required by the system.

Figure 3:
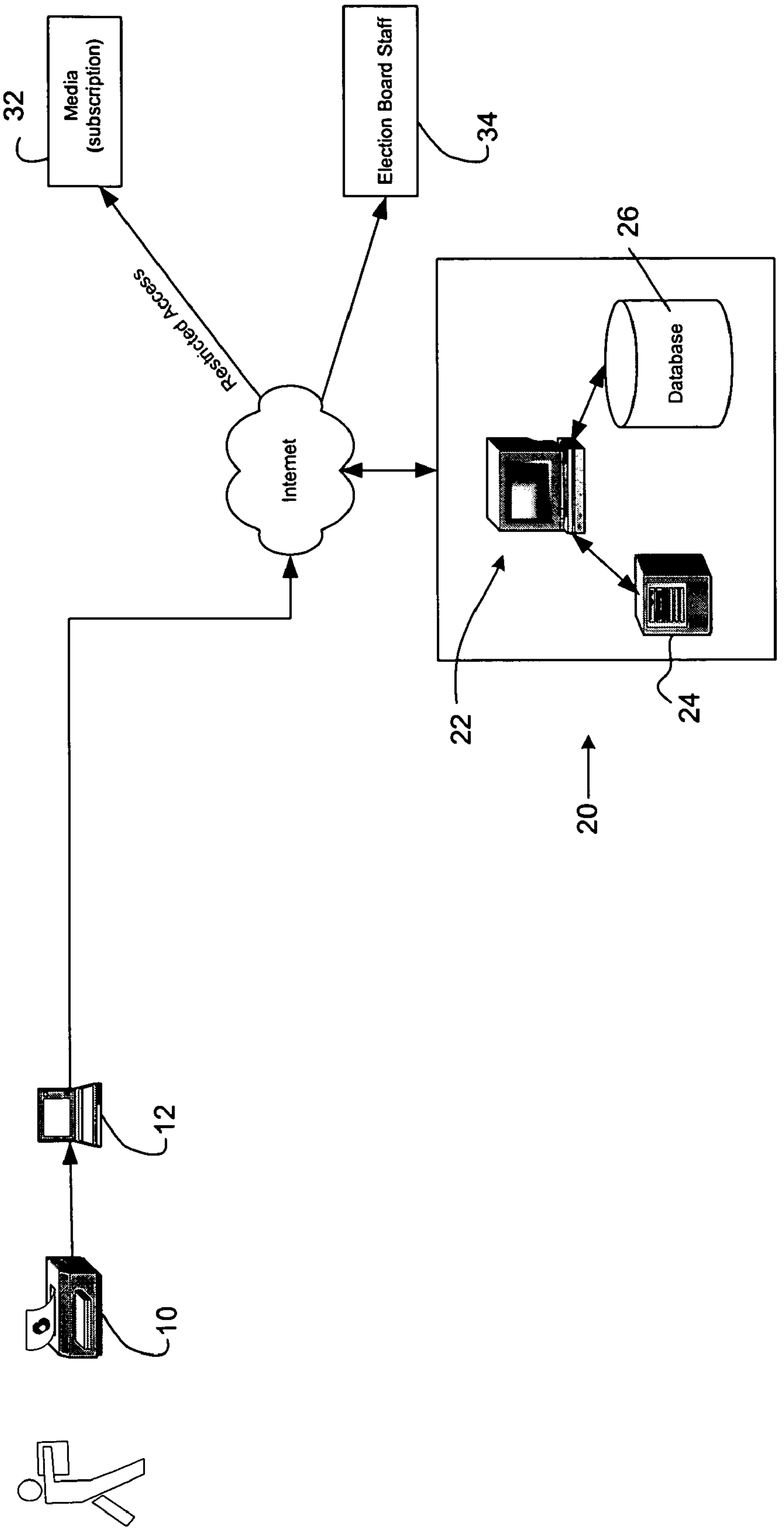
FIG. 3 is a schematic illustration of a third embodiment of a vote tracking and reporting system according to the present invention.

FIG. 3 illustrates a voting tracking and reporting system according to the present invention similar to that illustrated by FIGS. 1 and 2 and described above. As indicated by FIG. 3, however, the laptop computer at a polling place may be connected to the Internet by direct connection, such as T1, DSL or cable modem connection to an Internet Service Provider.

The voting reporting system of the present invention has been described with respect to particular configurations. For example, data may be transmitted by methods other than those describe such as by satellite transmission. It will be appreciated by those skilled in the art that the invention may be practiced other than as described. Therefore, the invention not be limited to the particular embodiment disclosed and what is sought to be protected is all embodiments falling within the scope of the appended claims.

The invention claimed is:

1. A voting tracking and reporting system comprising:

an acquisition and processing device, the acquisition and processing device configured to
- acquire data representing votes,
- encrypt the data representing votes,
- communicate with a data communication network, and
- transmit encrypted vote data via the data communication network in response to a request that is received from the data communication network; and a collection and processing system connected to the data communication network, the collection and processing system configured to
- receive data from and transmit data to the data communication network,
- decrypt vote data received from the acquisition and processing device,
- manipulate the vote data to determine characteristics of the vote data,
- store the vote data and characteristics, and
- transmit vote data and characteristics via the data communication network in response to authorized requests.

2. The voting tracking and reporting system of claim 1 wherein the acquisition and processing device is configured to transmit data representing votes to the data communication network upon detection of a predetermined event.

3. The voting tracking and reporting system of claim 2 wherein the predetermined event is acquisition of data representing votes.

4. The voting tracking and reporting system of claim 1 wherein the acquisition and processing device communicates with the data communication network via cellular telephone communication.

5. The voting tracking and reporting system of claim 1 wherein the acquisition and processing device communicates with the data communication network via wireless data network communication.

* * * * *